Patented Apr. 7, 1942

2,278,638

UNITED STATES PATENT OFFICE 2,278,638

FURYL VINYL KETONE AND HOMOLOGUES

Carl E. Barnes, Worcester, Mass., assignor, by mesne assignments, to E. I. du Pont de Nemours & Company, Wilmington, Del., a corporation of Delaware No Drawing. Original application December 6, 1938, Serial No. 244,219. Divided and this application December 11, 1939, Serial No. 308,645

10 Claims. (Cl. 260—63)

This invention relates to monomeric and polymeric vinyl ketones and to methods of making the same.

Synthetic resins are made by polymerization of various compounds containing the unsaturated group

(R being hydrogen, alkyl, halogen etc.) in which the bonds are considered to rearrange themselves to form a linear chain having the group

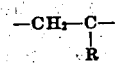

as a repeating unit. These linear compounds have the properties of fusibility and solubility. As set forth in my copending application Serial No. 240,529 filed November 15, 1938, vinyl methyl ketone and isopropenyl methyl ketone contain a polymerizable unsaturated methylene group capable of polymerization by a rearrangement of the bonds in such a way as to form a linear chain having the group

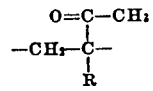

as a repeating unit in which R is H or $CH_3$.

In accordance with this invention, I have made furyl vinyl ketone and furyl isopropenyl ketone and I have found that these will polymerize and produce resins that may be used as shaped articles or as bonds for granular material, etc. The compounds contain both a polymerizable vinyl group and the furan group containing double bonds conjugated with this group. This conjugation is believed to activate the vinyl group in such a way that its tendency toward polymerization is greatly enhanced.

The primary object of this invention is to provide monomeric and polymeric substances comprising furyl vinyl ketone and furyl isopropenyl ketone.

Another object is to provide monomeric and polymeric substances for use in the manufacture of various articles including optical bodies, molded articles and bodies of bonded granular material. Further objects will be apparent in the following disclosure.

Furyl vinyl ketone may be made by treating furyl methyl ketone with formaldehyde in the presence of potassium carbonate or other suitable alkaline material, and thereafter dehydrating the product with iodine in the presence of calcium carbonate or other suitable alkaline agent capable of neutralizing any acid formed and preventing decomposition of the final product thereby. Similarly, furyl ethyl ketone may be treated with formaldehyde with subsequent dehydration to form furyl isopropenyl ketone (furyl methyl vinyl ketone). The reactions may be expressed by the following equation

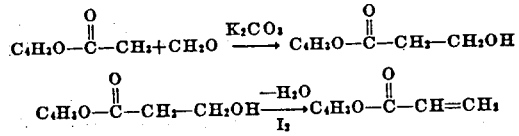

By substituting furyl ethyl ketone in the above reaction, the product will be furyl isopropenyl ketone. These ketones may also be prepared by treating the furyl alkyl ketone with formaldehyde in the presence of an alkyl ammonium salt, such as dimethyl ammonium chloride, and the reaction is thought to be as follows:

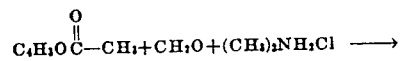

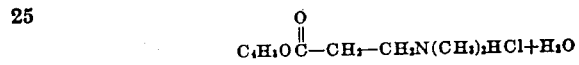

This last compound loses dimethyl ammonium chloride with the formation of furyl vinyl ketone:

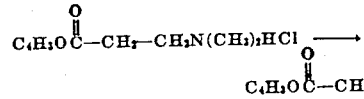

Furyl vinyl ketone boils at 85° C./10 mm. while furyl isopropenyl ketone boils at 92° C./10 mm.

These substances as thus produced are substantially transparent liquids which polymerize under standard polymerizing conditions to form transparent solid bodies which are linear polymers having a high refractive index. These substances may be used with base substances forming copolymers therewith. Suitable cross linking agents may be used, such as a compound with two or more polymerizable unsaturated methylene groups in the same molecule. During the polymerization the growing chains incorporate molecules of both substances forming a three dimensional structure. The number of linkages between the linear chains vary with the amount of the cross linking agent used, hence compounds of various degrees of hardness and solubility may be produced by changing the proportions. Suitable substances that may be copolymerized therewith are methacrylic acid, methacrylic anhydride, allyl methacrylate, ethylidine glycol methacrylate and divinyl ketone. Various other bodies may be copolymerized therewith for many useful purposes. Also, these ketones may be used to make shaped articles or as a bond for granular material, and the proportions of the materials employed will govern the characteristics of the product. Furyl vinyl ketone and furyl isopropenyl ketone have high indices of refraction, and these substances may therefore be used to modify the refractive index of other polymerizable substances and copolymers containing the same.

It is to be understood that while I have attempted to explain this invention in the light of the present accepted theory, the claims are not to be construed as dependent upon any particular theory relative to the formation of the substances herein claimed. Hence, the above description is to be interpreted as illustrating the general principles of the invention and my preferred manner of making the desired compounds and not as being limitations upon the case except as set forth in the claims appended hereto.

This case is a division of my copending application Serial No. 244,219 filed December 6, 1938.

I claim

1. A composition of matter comprising a compound selected from the group consisting of furyl vinyl ketone and furyl isopropenyl ketone.

2. A monomeric substance selected from the group consisting of furyl vinyl ketone and furyl isopropenyl ketone.

3. A polymeric substance derived by the polymerization of a material containing a substance selected from the group consisting of furyl vinyl ketone and furyl isopropenyl ketone.

4. A polymeric substance selected from the group consisting of furyl vinyl ketone and furyl isopropenyl ketone.

5. Furyl vinyl ketone.

6. Furyl isopropenyl ketone.

7. The method of making a compound from the group consisting of furyl vinyl ketone and furyl isopropenyl ketone, comprising the steps of treating a ketone from the group consisting of furyl methyl ketone and furyl ethyl ketone, with formaldehyde in the presence of an alkaline material and thereafter dehydrating the alcohol thus formed.

8. The method of making a compound from the group consisting of furyl vinyl ketone and furyl isopropenyl ketone, comprising the steps of treating a ketone from the group consisting of furyl methyl ketone and furyl ethyl ketone, with formaldehyde in the presence of an alkaline material and thereafter dehydrating the alcohol thus formed with iodine in the presence of an alkaline substance capable of neutralizing any acid thus formed.

9. Method of making a compound from the group consisting of furyl vinyl ketone and furyl isopropenyl ketone, comprising the steps of treating a ketone from the group consisting of furyl methyl ketone and furyl ethyl ketone, with formaldehyde in the presence of an alkaline carbonate and thereafter dehydrating the alcohol thus formed.

10. Method of making a compound from the group consisting of furyl vinyl ketone and furyl isopropenyl ketone, comprising the steps of treating a ketone from the group consisting of furyl methyl ketone and furyl ethyl ketone, with formaldehyde in the presence of an alkaline carbonate and thereafter dehydrating the alcohol thus formed with iodine in the presence of calcium carbonate.

CARL E. BARNES.

Certificate of Correction

Patent No. 2,278,638 — April 7, 1942.

CARL E. BARNES

It is hereby certified that error appears in the printed specification of the above numbered patent requiring correction as follows: Page 1, second column, lines 34 and 35, for that portion of the formula reading

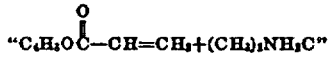

read

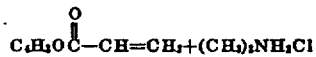

and that the said Letters Patent should be read with this correction therein that the same may conform to the record of the case in the Patent Office.

Signed and sealed this 9th day of June, A. D. 1942.

[SEAL]

HENRY VAN ARSDALE,
*Acting Commissioner of Patents.*